US006813496B2

(12) United States Patent
Numminen et al.

(10) Patent No.: US 6,813,496 B2
(45) Date of Patent: Nov. 2, 2004

(54) NETWORK ACCESS CONTROL

(75) Inventors: Raili Numminen, Tampere (FI); Kai Narvanen, Pirkkala (FI); Tero Rantala, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/370,597

(22) Filed: Feb. 24, 2003

(65) Prior Publication Data

US 2003/0125024 A1 Jul. 3, 2003

Related U.S. Application Data

(63) Continuation of application No. 09/626,643, filed on Jul. 27, 2000, now abandoned.

(30) Foreign Application Priority Data

Jul. 30, 1999 (GB) ............................................ 9918046

(51) Int. Cl.[7] .................................................. H04Q 7/20

(52) U.S. Cl. ..................... 455/445; 455/552.1; 455/411

(58) Field of Search ................................ 455/445, 434, 455/456, 410, 411, 517, 552.1, 414.1

(56) References Cited

U.S. PATENT DOCUMENTS

| | | | | | |
|---|---|---|---|---|---|
| 5,670,950 | A | | 9/1997 | Otsuka | |
| 5,729,542 | A | * | 3/1998 | Dupont | 370/346 |
| 5,793,762 | A | | 8/1998 | Penners et al. | |
| 5,953,328 | A | * | 9/1999 | Kim et al. | 370/337 |
| 6,049,712 | A | * | 4/2000 | Wallinder | 455/410 |
| 6,091,945 | A | * | 7/2000 | Oka | 455/411 |
| 6,259,909 | B1 | * | 7/2001 | Ratayczak et al. | 455/411 |
| 6,324,402 | B1 | * | 11/2001 | Waugh et al. | 455/445 |
| 6,389,284 | B1 | * | 5/2002 | Cook et al. | 455/434 |
| 6,453,159 | B1 | * | 9/2002 | Lewis | 455/411 |

FOREIGN PATENT DOCUMENTS

| | | | | |
|---|---|---|---|---|
| DE | 196 30 399 C1 | | 10/1997 | |
| GB | 2250660 A | | 6/1992 | |
| GB | 2 254 982 | * | 10/1992 | H04L/12/28 |
| GB | 2304497 A | | 3/1997 | |
| GB | 2322998 A | | 9/1998 | |
| WO | WO 96/13954 | | 5/1996 | |
| WO | WO 97/34437 | | 9/1997 | |
| WO | WO 98/15133 | | 4/1998 | |

* cited by examiner

*Primary Examiner*—William Trost
*Assistant Examiner*—Brandon Miller
(74) *Attorney, Agent, or Firm*—Squire, Sanders & Dempsey, L.L.P.

(57) ABSTRACT

An access control system for controlling access by wireless terminals to a wireless telecommunications network, the access control system comprising: a database storing the identities of a set of wireless terminals belonging to the telecommunications network; a configurable store for storing a supplementary access value indicative of whether terminals that do not belong to the telecommunications network may access the network; and an access control unit for receiving an access request message indicating the identity of a wireless terminal and in response to that message accessing the database and/or the store to permit access by the wireless terminal to the wireless telecommunications network if: a. the identity of the wireless terminal is present in the database; or b. the supplementary access value indicates that terminals that do not belong to the telecommunications network may access the network.

10 Claims, 2 Drawing Sheets

LAN
IP NETWORK
ILR
HLR
VLR
1
1
2
3
3
4
5
6
7
8
9
10
11
12
13
13
14
14

RECEIVE ACCESS REQUEST MESSAGE
ACCESS DATABASE
ID OF MOBILE PRESENT IN DATABASE ?
NO
ACCESS SUPPLEMENTARY ACCESS VALUE
YES
TRANSMIT MESSAGE TO PERMIT MOBILE TO ACCESS NETWORK
YES
MAY TERMINALS NOT BELONGING TO NETWORK GAIN ACCESS ?
NO
TRANSMIT MESSAGE TO DENY ACCESS.

NETWORK ACCESS CONTROL

This is a Continuation of application Ser. No. 09/626,643 filed Jul. 27, 2000 now abandoned. The disclosure of the prior application(s) is hereby incorporated by reference herein in its entirety.

FIELD OF THE INVENTION

The present invention relates to a company intranet and in particular to a method for dealing with visitors.

BACKGROUND OF THE INVENTION

Prior art office-based communications systems usually operate conventional fixed-line telephone units linked via an internal switchboard or PBX (private branch exchange.) Such fixed-line systems are able to provide relatively high voice quality. However, user mobility is severely impaired. It is also known to connect a base unit for a cordless system such as DECT to the internal PBX. This allows users to use cordless handsets in the office, but the server handsets (unless they are equipped with a dual-mode capability) can not be used outside the local cordless coverage area.

The improvement of digital cellular telephone technologies means that cellular telephone systems can now provide equivalent, if not higher, voice quality than fixed-line systems. Mobile systems also allow greater freedom of movement for the user within the office than do fixed-line systems. However, there can often be difficulties in receiving cellular telephone signals in an office.

RCP (Rich Call Platform) is a proprietary communications system developed by the applicants which introduces the concept of utilising mobile telephone units, such as conventional GSM mobile stations, in an office environment. The system preferably makes use of a known concept called Internet Telephony or Voice-over-IP (Internet Protocol).

Voice-over-IP is a technology which allows sound information to be transmitted over existing IP-based Local or Wide Area Networks or the Internet. In a similar way, data and video information can be encoded so as to be capable of transmission over the same networks. The technology thus provides for convergence and integration of three different media types over the same network.

Prior to the advent of Voice-over-IP, offices often operated three separate networks for the transmission of these media types. As indicated above, fixed-line telephone systems coupled to an in-house PBX provided for voice communication, an office-based LAN or Intranet (i.e. a packet-switched internal network), normally comprising computer terminals linked via network cards and under the control of a server station, provided for the transmission of "conventional" computer data, and video cameras linked to monitors via fixed line or remote transmission link provided for video communication.

Voice-over-IP effectively combines these three media types such that they can be transmitted simultaneously on the same packet-switched intranet network or IP-routed throughout the office environment and, using an external network such as the internet, beyond the confines of the office.

In order to provide for such media convergence, Voice-over-IP often uses a specific ITU (International Telecommunication Union) standard protocol to control the media flow over the Intranet. One common standard protocol used in Voice-over-IP systems, and the one used in the RCP system, is termed H.323.

H.323 is an ITU standard for multimedia communications (voice, video and data) and allows multimedia streaming over conventional packet-switched networks. The protocol provides for call control, multimedia management and bandwidth management for both point-to-point (2 end-users) and multipoint (3 or more end-users) conferences. H.323 also supports standard video and audio codecs (compression/decompression methods such as MPEG) and supports data sharing via the T.120 standard.

Furthermore, H.323 is network, platform and application independent allowing any H.323 compliant terminal to operate in conjunction with any other terminal. The H.323 standard defines the use of three further command and control protocols:

a) H.245 for call control;

b) Q.931 for call signalling; and c) The RAS (Registrations, Admissions and Status) signalling function.

The H.245 control channel is responsible for control messages governing the operation of the H.323 terminal including capability exchanges, commands and indications. Q.931 is used to set up a connection between two terminals. RAS governs registration, admission and bandwidth functions between endpoints and Mobile Telephone Server (defined later).

For an H.323 based communication system, the standard defines four major components:

1. Terminal
2. Gateway
3. Mobile Telephone Server
4. Multipoint Control Unit (MCU)

Terminals are the user end-points on the network, e.g. a telephone or fax unit or a computer terminal. All H.323 compliant terminals must support voice communications, but video and data support is optional.

Gateways connect H.323 networks to other networks or protocols. For an entirely internal communications network i.e. with no external call facility, gateways are not required.

Mobile Telephone Servers are the control centre of the Voice-over-IP network. It is under the control of a Mobile Telephone Server that most transactions (communication between two terminals) are established. Primary functions of the Mobile Telephone Server are address translation, bandwidth management and call control to limit the number of simultaneous H.323 connections and the total bandwidth used by those connections. An H.323 "zone" is defined as the collection of all terminals, gateways and multipoint-control units (MCU—defined below) which are managed by a single Mobile Telephone Server.

Multipoint Control Units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional Voice-over-IP system described herein above normally utilises standard fixed-line telephone systems which are subject to the disadvantages outlined above, namely the lack of mobility and the lack of user commands.

The RCP concept takes Voice-over-IP further in that it provides for the use of conventional mobile telephone units, such as GSM mobile stations, within the Voice-over-IP system. To provide for such mobile communications within an intra-office communication network, RCP combines known Voice-over-IP, as described above, with conventional GSM-based mobile systems.

GSM base stations are provided to give coverage within the office, and are connected to the company's intranet. Intra-office calls to or from cellular telephones in the office are routed through the office intranet and extra-office calls are routed conventionally through the GSM network. Such a system provides most or all of the features supported by the mobile station and the network such as telephone directories, short messaging, multiparty services, data calls, call barring, call forwarding etc. RCP, therefore, provides for integrated voice, video and data communications by interfacing an H.323-based voice-over-IP network with a GSM mobile network.

The RCP system is a cellular network, similar to the conventional GSM network and is divided into H.323 Zones as described above. One H.323 Zone may comprise a number of cells. Two or more H.323 zones may be contained within an administrative domain. The allocation of H.323 zones to an administrative domain is an issue primarily concerning billing and is therefore not relevant to this invention.

A company RCP may be physically located in two or more separate office sites. These sites may reside in two different countries in areas managed by two or more different GSM operators. They may also reside in different regions of a country, in which two different GSM operators would be competing for customers.

It would be desirable to provide a method of allowing subscribers to use the internal site network when visiting different sites belonging to the same company and to make calls from their own site to other company sites which are routed over the company RCP system, and without being routed outside the company's own network.

It would be desirable to have a method for controlling access to the RCP network (or another like network), that would be configurable to allow or disallow visitors to use the network for signalling and calls outside the RCP system at any particular time.

SUMMARY OF THE INVENTION

According to one aspect of the present invention, there is provided an access control system for controlling access by wireless terminals to a wireless telecommunications network, the access control system comprising: a database storing the identities of a set of wireless terminals belonging to the telecommunications network; a configurable store for storing a supplementary access value indicative of whether terminals that do not belong to the telecommunications network may access the network; and an access control unit for receiving an access request message indicating the identity of a wireless terminal and in response to that message accessing the database and/or the store to permit access to the wireless telecommunications network by the wireless terminal if:

a. the identity of the wireless terminal is present in the database; or b. the supplementary access value indicates that terminals that do not belong to the telecommunications network may access the network.

According to a second aspect of the present invention there is provided a method for controlling access by wireless terminals to a wireless telecommunications network having a database storing the identities of a set of wireless terminals belonging to the telecommunications network and a configurable store for storing a supplementary access value indicative of whether terminals that do not belong to the telecommunications network may access the network; the method comprising: receiving an access request message indicating the identity of a wireless terminal; accessing the database to determine whether the identity of the wireless terminal is present in the database and/or accessing the supplementary access value to determine whether it indicates that terminals that do not belong to the telecommunications network may access the network; and if:

a. the identity of the wireless terminal is present in the database; or b. the supplementary access value indicates that terminals that do not belong to the telecommunications network may access the network; transmitting a message to permit the wireless terminal access to the wireless telecommunications network.

The access control unit may suitably be configured to permit or deny access to the network by means of transmitting a permission or denial message. That message may, for example, be transmitted to the terminal itself or to another network. That other network may be a network which the terminal currently is permitted to access.

The access request message may be a location update request. The access control unit suitably replies to such a location update request by transmitting a location update response. Where access is to be denied the message may be a location update reject message, preferably (where this is provided for) with a value indicative of location access not being allowed.

If:

a. the identity of the wireless terminal is not present in the database; and b. the supplementary access value indicates that terminals that do not belong to the telecommunications network may not access the said network; then the access control unit suitably denies access by the terminal to the network.

One or other or both of the networks may be operable according to the GSM standard or a derivative thereof. The said network is suitably a localised network, preferably one employing an intranet or other packet-based communications system for at least some traffic communications. The said network is suitably under the control of an operator of the other network. One or both of the networks may be cellular telephone systems. The said identities may be provided as any suitable identifier. In a GSM system, or in certain other systems derived from the GSM standard, the identities may be IMSIs. In other networks the equivalent level of identification is preferably used.

The wireless telecommunications network could be a data network.

The access control unit need not be the only unit that has control over access to the said network. The access control unit could itself be under the control of another unit (e.g. a unit at the other network) or could share control with such a unit.

BRIEF DESCRIPTION OF THE DRAWINGS

The present invention will now be described by way of example with reference to the accompanying drawings, in which.

DESCRIPTION OF THE PREFERRED EMBODIMENT

Figure 1:
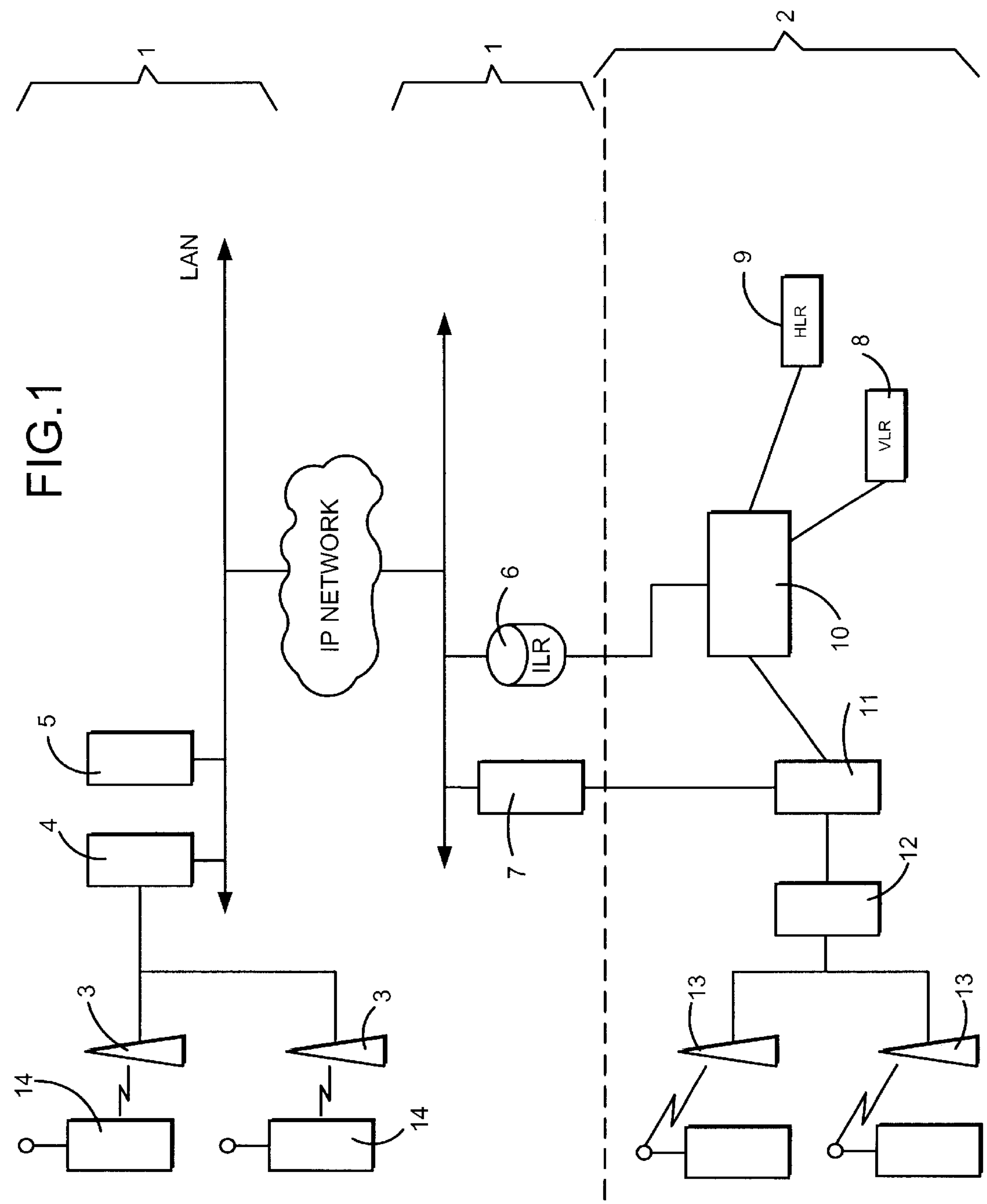
FIG. 1 shows schematically components of the intranet and external internet and mobile telecommunications system which are related to the present invention.

FIG. 1 shows schematically some components of an office intranet and an external internet and mobile telecommunications system. The office intranet area is indicated generally by 1 and the external internet and mobile telecommunications system area is indicated generally by 2.

The relevant components of the intranet system 1 as shown are a Base Transceiver Station (BTS) 3, an Intranet Mobile Cluster (IMC) 4, a RCP Mobile Telephone Server (MTS) 5, an Intranet Location Register (ILR) database 6 and an A-Intranet Gateway 7. These components are connected over a wireless Local Area Network (LAN), forming the "office network" 1.

The relevant components of the internet and mobile telecommunications system 2 as shown are a Visitor Location Register (VLR) 8, an integrated Home Location Register, Authentication Centre and Equipment Identity Register (HLR/AC/EIR) 9, a Mobile Switching Centre (MSC) 10, a Transcoder and Subrate Channel Multiplexer (TSCM) 11, a Base Station Controller (BSC) 12 and BTSs 13. Together these components form the "operator network" 2. The VLR and the HLR and other registers could be integrated as part of the MSC. In this example the wireless telephone service is a GSM service, but the service could be provided by other communications systems.

The BTS 3 is equivalent to the BTSs 13 in the GSM operator network and its purpose is to receive and transmit signals to and from mobile phones and to interface with the IMC. The IMC is equivalent to a Base Station Controller in a standard GSM network. Its functions include detection of the possible need for handover, generation of speech and data frames, configuration of the BTS, control of interfacing with the MTS including status enquiry and establishing calls to/from the BTS. The MTS is responsible for controlling access to the intranet, by using information obtained from the ILR, as will be described in more detail below. The ILR is managed by the home GSM network operator and resides in the home GSM operator premises. It has access to two GSM registers via a MAP interface, namely the HLR 9 and VLR 8. The HLR and VLR hold all the location information of all subscribers. The HLR is a database which contains all the data concerning the access capabilities of subscribers of the site with which it is associated, and services to which they are entitled. Also the HLR provides MSCs associated with other sites with similar information to allow the subscriber to receive calls whilst visiting another site which is part of the same intranet. The Equipment Identity Register within an Authentication Centre allows interrogation of the HLR for verifying whether a user is listed in the HLR. The VLR stores subscriber information for all mobile phones which enter its area of coverage, which allows the MSC to set up calls to and from such phones. When a mobile phone enters its area, the subscriber data is interrogated and can be added to the VLR, so the VLR would contain the address of the subscriber's HLR.

The office and operator networks 1,2 are connected by three interfaces:

- A-interface at the Intranet Gateway 7 of office network 1 to the TCSM 11—this is a GSM-specified gateway which controls operation, maintenance and transcoder functions and is the route used for speech. The TCSM is a further interface which interfaces with the MSC 10.
- Pulse Code Modulation (PCM) providing a physical connection between the ILR 6 and the MSC 10—for data and signalling
- Mobile Application Part (MAP) interface protocol between the ILR 6 and the MSC 10—for data and signalling In a typical office environment having an internal intranet, company members and a variable number of visitors, all carrying GSM mobile phones 14 will enter the geographical area of the intranet 1. If they are in the middle of a call, their phone will continue to send and receive signals via the external BTS to which it is already connected, thus using the external network as normal. At the end of the call, or if they enter the intranet area whilst not in the middle of a call, their phone will automatically try to attach to the BTS 3, since this would be the closest one. This attempt to attach is called a Location Update (LU) request. The intranet BTS 3 is similar to normal external BTSs, hence mobile phones will try to attach to it as they would any BTS which comes into geographical proximity.

Figure 2:
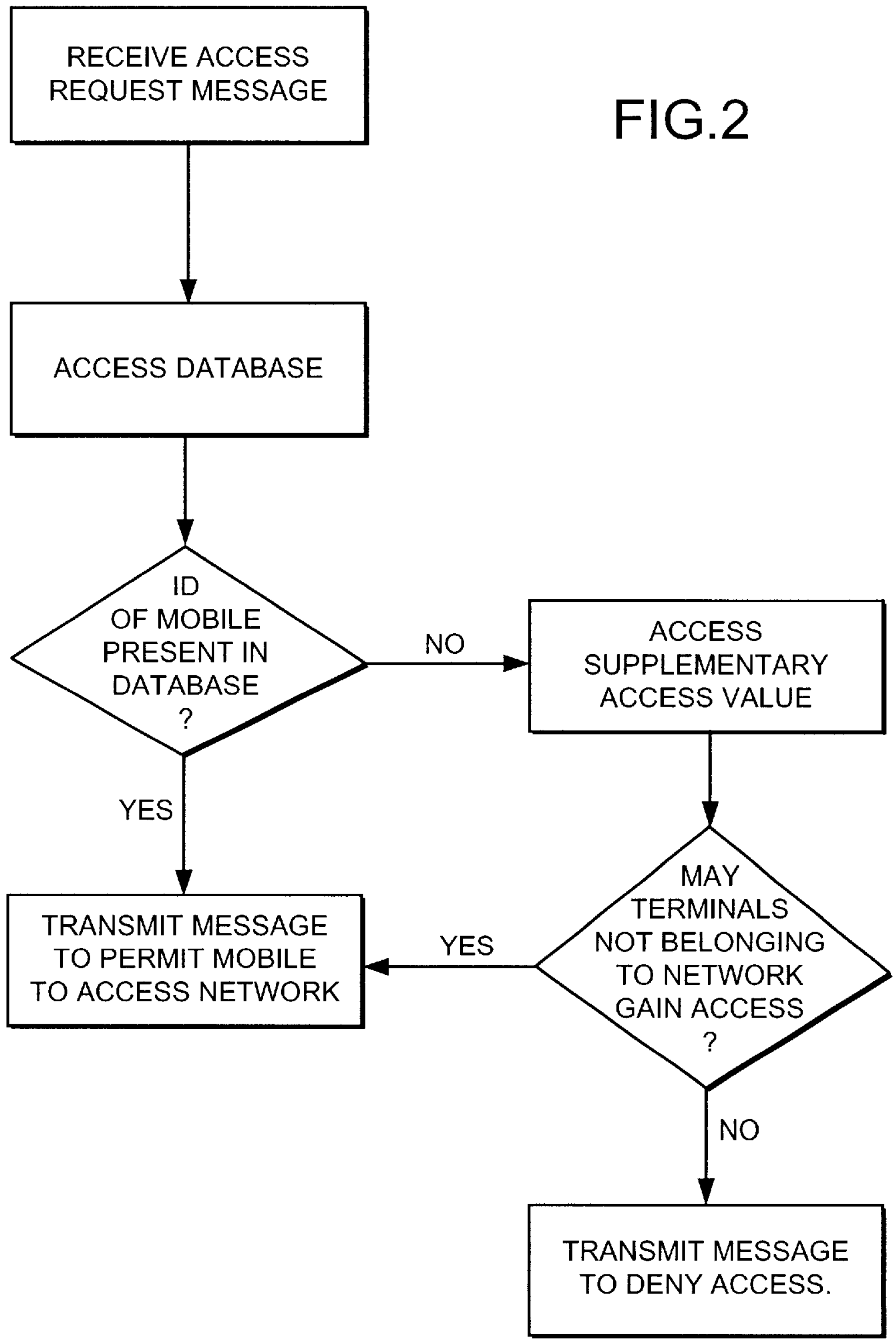
FIG. 2 is a flowchart indicating the method of operation of the system.

The method of operation of the system is shown in FIG. 2.

Upon receiving an LU, the BTS 3 sends the signal to the IMC 4. When the IMC 4 receives the signal, it accesses the MTS for information as to whether the user is to be allowed to access the network. The MTS checks the ILR database 6. This ILR contains a list of all the company members' IMSIs, or has other identifier information such as phone numbers that allow members belonging tot he company network to be identified. This identifier is preferably the same as is used in the LU request message, to allow matching to be done easily. The ILR sends a signal back to the MTS indicating whether the LU request is from a company member or a visitor.

If the signal received back by the MTS indicates that the LU is from a company member, it informs the IMC as such and the IMC then allows the phone to attach to the BTS 3. This means that internal calls between two employees are routed from the first employee to a BTS 3, to the IMC 4, to the MTS 5 and to the second employee via the BTS 3. External calls from an employee to any phone outside the intranet are routed via BTS 3, to the IMC 4, to the MTS 5 and to the A-Intranet Gateway 7, where they are transferred over the A-interface to the TCSM 11. From here they are sent to the MSC and then forwarded to the BSC 12 and to a BTS 13, from where the phone can receive them.

If the signal received back by the MTS indicates that the LU is from a visitor, the MTS makes a decision as to whether to allow the visitor to access the intranet. This is possible because it can be configured in two ways by use of a single parameter. The parameter can be set by the company IT department, to allow or reject the LU request. The advantage of this process is that the IT department can decide at any particular time whether or not to allow visitors access to the intranet. This could be important at busy periods during which visitors cause considerable extra load on the system. Thus a high service quality can be maintained at all times for company members. The GSM operator may also have the ability to set the parameter, to allow load on the external GSM network to be relieved by the RCP network.

If the parameter is set so as not to allow visitors access to the intranet, the MTS sends an appropriate signal to the IMC which then prevents the BTS 3 from allowing the phone to attach to it. The phone will remain attached to or search for the nearest external BTS. This can be done using standard GSM codes.

If the parameter is set so as to allow visitors access to the intranet, the MTS sends a different signal to the IMC which allows the BTS to attach to the phone. The visitor's calls are then routed through the LAN and out to the external system. The facility for direct access to other phones within the intranet would not be available to visitors. Nevertheless, the fact that their calls are routed through the intranet would improve the quality of reception for the visitor.

The parameter does not indicate the ability of specific users to access the intranet. Specific additional users can be allowed access by making additions to the database of members. In a GSM-based system the location update request is not a prerequisite to the making of a handover from one base station to another. Thus the system as described above would not, in such a GSM-based system, deny access to the intranet to terminals that requested handovers into the RCP system. Such handovers may be tolerated, or could be blocked (at least to non-member terminals) by other means associated with the handover procedure.

It is possible that the company intranet would be owned by the external operator and leased by the company. The system would then operate in a similar manner except the ILR would communicate via the PCM interface through the MSC 10 to the VLR 8 and the HLR AC EIR 9 owned by the operator. This means, for example, that the ILR would be interrogated to determine whether an LU request was from a RCP member or not. Furthermore the VLR 8 could be used to list visitors who were temporarily using the office network 1.

APPENDIX

| SSD Case No. | Assignee | Application No. | Filing Date | Patent No. | Issue Date | Reel/Frame | Recordation Date |
|---|---|---|---|---|---|---|---|
| 5964300028 | Nokia Networks OY | 09/544,667 | 06-Apr-2000 | | | 011030/0497 | 01-Aug-2000 |
| 5964300029 | Nokia Networks OY | 09/625,260 | 25-Jul-2000 | | | 011004/0179 | 25-Jul-2000 |
| 5964300030 | Nokia Networks OY | 09/777,751 | 05-Feb-2001 | | | 011702/0334 | 16-Apr-2001 |
| 5964300031 | Nokia Networks OY | 09/612,762 | 10-Jul-2000 | | | 010954/0508 | 10-Jul-2000 |
| 5964300038 | Nokia Networks OY | 09/536,213 | 27-Mar-2000 | | | 011025/0134 | 31-Jul-2000 |
| 5964300039 | Nokia Networks OY | 09/956,735 | 11-Sep-2001 | | | 012194/0674 | 11-Sep-2001 |
| 5964300040 | Nokia Networks OY | 09/721,363 | 22-Nov-2000 | | | 011334/0610 | 22-Nov-2000 |
| 5964300041 | Nokia Networks OY | 09/812,191 | 19-Mar-2001 | | | 011940/0705 | 02-Jul-2001 |
| 5964300043 | Nokia Networks OY | 09/506,538 | 17-Feb-2000 | | | 010933/0096 | 27-Jun-2000 |
| 5964300044 | Nokia Networks OY | 09/474,606 | 29-Dec-1999 | | | 10739/0028 | 06-Apr-2000 |
| 5964300045 | Nokia Networks OY | 09/767,290 | 19-Jan-2001 | | | 011727/0320 | 16-Apr-2001 |
| 5964300046 | Nokia Networks OY | 09/454,365 | 03-Dec-1999 | 6,487,411 | 26-Nov-2002 | 012183/0827 | 06-Nov-2000 |
| 5964300047 | Nokia Networks OY | 09/490,797 | 26-Jan-2000 | | | 010833/0714 | 16-May-2000 |
| 5964300048 | Nokia Networks OY | 09/450,367 | 29-Nov-1999 | 6,477,207 | 05-Nov-2002 | 010660/0148 | 13-Mar-2000 |
| 5964300049 | Nokia Networks OY | 09/521,760 | 09-Mar-2000 | | | 010940/0043 | 18-Jul-2000 |
| 5964300051 | Nokia Networks OY | 09/641,285 | 17-Aug-2000 | | | 011331/0430 | 27-Nov-2000 |
| 5964300052 | Nokia Networks OY | 09/626,023 | 27-Jul-2000 | | | 01147/0879 | 13-Nov-2000 |
| 5964300053 | Nokia Networks OY | 09/724,339 | 28-Nov-2000 | | | 011329/0358 | 28-Nov-2000 |
| 5964300055 | Nokia Networks OY | 09/708,103 | 03-Nov-2000 | | | 011527/0463 | 15-Feb-2001 |
| 5964300056 | Nokia Networks OY | 09/749,161 | 27-Dec-2000 | | | 011611/0814 | 07-Mar-2001 |
| 5964300057 | Nokia Networks OY | 09/748,220 | 27-Dec-2000 | | | 011676/0625 | 02-Apr-2001 |
| 5964300058 | Nokia Networks OY | 09/765,144 | 18-Jan-2001 | | | 011758/0099 | 27-Apr-2001 |
| 5964300059 | Nokia Networks OY | 09/838,818 | 19-Apr-2001 | | | 012006/0965 | 24-Jul-2001 |
| 5964300060 | Nokia Networks OY | 09/871,841 | 01-Jun-2001 | | | 012254/0618 | 09-Oct-2001 |
| 5964300061 | Nokia Networks OY | 09/874,823 | 05-Jun-2001 | | | 012249/0490 | 10-Oct-2001 |
| 5964300062 | Nokia Networks OY | 09/878,861 | 11-Jun-2001 | | | 012249/0644 | 09-Oct-2001 |
| 5964300063 | Nokia Networks OY | 09/875,335 | 06-Jun-2001 | | | 012245/0547 | 09-Oct-2001 |
| 5964300064 | Nokia Networks OY | 09/739,030 | 13-Dec-2000 | | | 012135/0329 | 04-Sep-2001 |
| 5964300065 | Nokia Networks OY | 09/792,682 | 23-Feb-2001 | | | Unknown | 11-Jul-2001 |
| 5964300066 | Nokia Networks OY | 09/881,395 | 14-Jun-2001 | | | 012277/0074 | 16-Oct-2001 |
| 5964300067 | Nokia Networks OY | 09/887,481 | 22-Jun-2001 | | | 012267/0826 | 15-Oct-2001 |
| 5964300068 | Nokia Networks OY | 09/893,792 | 28-Jun-2001 | | | 012424/0332 | 03-Jan-2002 |
| 5964300072 | Nokia Networks OY | 09/975,410 | 10-Oct-2001 | | | 012256/0745 | 10-Oct-2001 |
| 5964300073 | Nokia Networks OY | 09/942,315 | 29-Aug-2001 | | | 012544/0283 | 24-Jan-2002 |

| | | | | | | | |
|---|---|---|---|---|---|---|---|
| 5964300075 | Nokia Networks OY | 09/924,863 | 08-Aug-2001 | | | 012446/0493 | 04-Jan-2002 |
| 5964300076 | Nokia Networks OY | 09/927,601 | 10-Aug-2001 | | | 012515/0769 | 18-Jan-2002 |
| 5964300077 | Nokia Networks OY | 09/913,194 | 09-Aug-2001 | | | 012649/0886 | 11-Feb-2002 |
| 5964300079 | Nokia Networks OY | 09/418,138 | 14-Oct-1999 | | | 010529/0893 | 22-Dec-1999 |
| 5964300080 | Nokia Networks OY | 09/421,057 | 19-Oct-1999 | 6,487,410 | 26-Nov-2002 | 010498/0866 | 16-Dec-1999 |
| 5964300081 | Nokia Networks OY | 09/436,450 | 08-Nov-1999 | | | 010638/0623 | 29-Feb-2000 |
| 5964300082 | Nokia Networks OY | 09/628,868 | 12-Nov-1999 | | | 010394/0452 | 12-Nov-1999 |
| 5964300083 | Nokia Networks OY | 09/464,944 | 16-Dec-1999 | | | 010700/0092 | 20-Mar-2000 |
| 5964300084 | Nokia Networks OY | 09/458,933 | 10-Dec-1999 | | | 010743/0399 | 03-Apr-2000 |
| 5964300085 | Nokia Networks OY | 09/480,100 | 10-Jan-2000 | | | 010735/0197 | 04-Apr-2000 |
| 5964300086 | Nokia Networks OY | 09/480,235 | 10-Jan-2000 | | | 010735/0429 | 10-Apr-2000 |
| 5964300087 | Nokia Networks OY | 09/510,893 | 23-Feb-2000 | | | 010959/0404 | 12-Jul-2000 |
| 5964300088 | Nokia Networks OY | 09/504,996 | 15-Feb-2000 | | | 010833/0712 | 15-May-2000 |
| 5964300089 | Nokia Networks OY | 09/512,120 | 24-Feb-2000 | | | 010633/0362 | 24-Feb-2000 |
| 5964300090 | Nokia Networks OY | 09/522,700 | 10-Mar-2000 | | | 011215/0510 | 30-Oct-2000 |
| 5964300091 | Nokia Networks OY | 09/594,334 | 15-Jun-2000 | | | 011078/0329 | 05-Sep-2000 |
| 5964300092 | Nokia Networks OY | 09/544,668 | 06-Apr-2000 | | | 011259/0086 | 28-Dec-2000 |
| 5964300093 | Nokia Networks OY | 09/559,842 | 26-Apr-2000 | | | 011065/0164 | 25-Aug-2000 |
| 5964300094 | Nokia Networks OY | 09/559,838 | 26-Apr-2000 | | | 011066/0121 | 28-Aug-2000 |
| 5964300095 | Nokia Networks OY | 09/571,572 | 17-May-2000 | | | 011152/0179 | 10-Oct-2000 |
| 5964300096 | Nokia Networks OY | 09/595,396 | 14-Jun-2000 | | | 011412/0796 | 02-Oct-2000 |
| 5964300097 | Nokia Networks OY | 09/588,954 | 07-Jun-2000 | | | 011140/0392 | 25-Sep-2000 |
| 5964300098 | Nokia Networks OY | 09/604,501 | 27-Jun-2000 | | | 010925/0687 | 27-Jun-2000 |
| 5964300099 | Nokia Networks OY | 09/631,078 | 02-Aug-2000 | | | 011515/0942 | 12-Feb-2001 |
| 5964300100 | Nokia Networks OY | 09/616,313 | 17-Jul-2000 | | | 010967/0598 | 17-Jul-2000 |
| 5964300101 | Nokia Networks OY | 09/625,346 | 25-Jul-2000 | | | 011004/0175 | 25-Jul-2000 |
| 5964300102 | Nokia Networks OY | 09/625,344 | 25-Jul-2000 | | | 011004/0177 | 25-Jul-2000 |
| 5964300103 | Nokia Networks OY | 09/625,114 | 25-Jul-2000 | | | 011004/0213 | 25-Jul-2000 |
| 5964300104 | Nokia Networks OY | 09/625,115 | 25-Jul-2000 | | | 011004/0268 | 25-Jul-2000 |
| 5964300105 | Nokia Networks OY | 09/623,928 | 08-Sep-2000 | | | 011631/0053 | 19-Mar-2001 |
| 5964300107 | Nokia Networks OY | 09/660,668 | 13-Sep-2000 | | | 011331/0298 | 27-Nov-2000 |
| 5964300108 | Nokia Networks OY | 09/660,133 | 12-Sep-2000 | | | 011317/0904 | 20-Nov-2000 |
| 5964300109 | Nokia Networks OY | 09/698,881 | 27-Oct-2000 | | | 011268/0615 | 27-Oct-2000 |
| 5964300110 | Nokia Networks OY | 09/679,476 | 04-Oct-2000 | | | 011341/0079 | 05-Dec-2000 |
| 5964300111 | Nokia Networks OY | 09/679,472 | 04-Oct-2000 | | | 011399/0715 | 26-Dec-2000 |

| 5964300112 | Nokia Networks OY | 09/704,208 | 01-Nov-2000 | | | 011596/0135 | 02-Mar-2001 |
|---|---|---|---|---|---|---|---|
| 5964300113 | Nokia Networks OY | 09/706,021 | 03-Nov-2000 | | | 011282/0694 | 03-Nov-2000 |
| 5964300114 | Nokia Networks OY | 09/751,138 | 29-Dec-2000 | | | 011608/0871 | 12-Mar-2001 |
| 5964300115 | Nokia Networks OY | 09/795,379 | 28-Feb-2001 | | | 011676/0618 | 02-Apr-2001 |
| 5964300116 | Nokia Networks OY | 09/819,022 | 26-Mar-2001 | | | 011978/0040 | 29-Jun-2001 |
| 5964300117 | Nokia Networks OY | 09/817,886 | 26-Mar-2001 | | | 011662/0356 | 26-Mar-2001 |
| 5964300118 | Nokia Networks OY | 09/837,962 | 17-Apr-2001 | | | 011734/0033 | 17-Apr-2001 |
| 5964300119 | Nokia Networks OY | 09/842,490 | 25-Apr-2001 | | | 011761/0434 | 25-Apr-2001 |
| 5964300120 | Nokia Networks OY | 09/871,862 | 01-Jun-2001 | | | 012216/0254 | 02-Oct-2001 |
| 5964300122 | Nokia Networks OY | 09/876,421 | 04-Jun-2001 | | | 012242/0235 | 09-Oct-2001 |
| 5964300123 | Nokia Networks OY | 09/885,387 | 20-Jun-2001 | | | 012274/0048 | 15-Oct-2001 |
| 5964300125 | Nokia Networks OY | 09/882,949 | 15-Jun-2001 | | | 012277/0147 | 16-Oct-2001 |
| 5964300126 | Nokia Networks OY | 09/908,186 | 18-Jul-2001 | | | 012398/0890 | 22-Oct-2001 |
| 5964300128 | Nokia Networks OY | 09/909,039 | 19-Jul-2001 | | | 012408/0268 | 31-Dec-2001 |
| 5964300129 | Nokia Networks OY | 09/953,392 | 12-Sep-2001 | | | 012179/0077 | 12-Sep-2001 |
| 5964300133 | Nokia Networks OY | 09/978,981 | 15-Oct-2001 | | | 012274/0640 | 15-Oct-2001 |
| 5964300154 | Nokia Networks OY | 09/591,679 | 09-Jun-2000 | | | 011105/0954 | 21-Sep-2000 |
| 5964300155 | Nokia Networks OY | 09/600,951 | 19-Jul-2000 | | | 011005/0403 | 19-Jul-2000 |
| 5964300156 | Nokia Networks OY | 09/711,673 | 09-Nov-2000 | | | 012458/0301 | 09-Jan-2002 |
| 5964300159 | Nokia Networks OY | 09/528,796 | 16-Mar-2000 | 6,501,948 | 31-Dec-2002 | 010940/0090 | 18-Jul-2000 |
| 5964300161 | Nokia Networks OY | 09/835,427 | 06-Apr-2001 | | | 011998/0819 | 16-Jul-2001 |
| 5964300162 | Nokia Networks OY | 09/879,566 | 12-Jun-2001 | | | 012249/0381 | 09-Oct-2001 |
| 5964300163 | Nokia Networks OY | 09/891,732 | 26-Jun-2001 | 6,501,575 | 31-Dec-2002 | 012277/0076 | 16-Oct-2001 |
| 5964300183 | Nokia Networks OY | 09/871,455 | 31-May-2001 | | | 012254/0625 | 09-Oct-2001 |
| 5964300184 | Nokia Networks OY | 09/871,456 | 31-May-2001 | | | 012246/0917 | 10-Oct-2001 |
| 5964300185 | Nokia Networks OY | 09/626,643 | 27-Jul-2000 | | | 011233/0397 | 01-Nov-2000 |
| 5964300186 | Nokia Networks OY | 09/510,611 | 22-Feb-2000 | | | 010954/0175 | 22-Jun-2000 |
| 5964300187 | Nokia Networks OY | 09/456,658 | 09-Dec-1999 | | | 010683/0213 | 17-Mar-2000 |
| 5964300188 | Nokia Networks OY | 09/491,524 | 26-Jan-2000 | | | 011065/0152 | 25-Aug-2000 |
| 5964300189 | Nokia Networks OY | 09/516,971 | 29-Feb-2000 | | | 011080/0811 | 08-Sep-2000 |
| 5964300190 | Nokia Networks OY | 09/593,651 | 13-Jun-2000 | | | 010897/0656 | 13-Jun-2000 |
| 5964300191 | Nokia Networks OY | 09/590,562 | 09-Jun-2000 | | | 010870/0312 | 09-Jun-2000 |
| 5964300192 | Nokia Networks OY | 09/580,753 | 30-May-2000 | | | 010834/0820 | 30-May-2000 |
| 5964300197 | Nokia Networks OY | 09/967,261 | 28-Sep-2001 | | | 012416/0714 | 03-Jan-2002 |
| 5964300198 | Nokia Networks OY | 09/923,845 | 07-Aug-2001 | | | 012491/0434 | 16-Jan-2002 |

| | | | | | | | |
|---|---|---|---|---|---|---|---|
| 5964300199 | Nokia Networks OY | 09/913,576 | 13-Aug-2001 | | | 012265/0186 | 13-Aug-2001 |
| 5964300203 | Nokia Networks OY | 09/449,578 | 29-Nov-1999 | | | 010665/0696 | 25-Feb-2000 |
| 5986400011 | Nokia Networks OY | 09/430,938 | 01-Nov-1999 | | | 010363/0245 | 01-Nov-1999 |
| 5986400013 | Nokia Networks OY | 09/408,567 | 29-Sep-1999 | | | 010701/0385 | 17-Mar-2000 |
| 5986400015 | Nokia Networks OY | 09/396,807 | 14-Sep-1999 | | | 010449/0264 | 16-Dec-1999 |
| 5986400017 | Nokia Networks OY | 09/391,119 | 07-Sep-1999 | | | 010457/0820 | 10-Dec-1999 |
| 5986400018 | Nokia Networks OY | 09/390,910 | 07-Sep-1999 | | | 010429/0382 | 29-Nov-1999 |
| 5986400088 | Nokia Networks OY | 09/377,263 | 19-Aug-1999 | | | 010348/0446 | 01-Nov-1999 |
| 5986400089 | Nokia Networks OY | 09/449,575 | 29-Nov-1999 | | | 010427/0668 | 29-Nov-1999 |
| 5986400091 | Nokia Networks OY | 09/364,523 | 30-Jul-1999 | | | 011000/0521 | 26-Jul-2000 |
| 6009100011 | Nokia Networks OY | 09/592,156 | 12-Jun-2000 | | | 011105/0873 | 21-Sep-2000 |
| 6009100012 | Nokia Networks OY | 09/603,018 | 26-Jun-2000 | | | 011175/0570 | 13-Oct-2000 |
| 6009100013 | Nokia Networks OY | 09/606,635 | 29-Jun-2000 | | | 010932/0931 | 29-Jun-2000 |
| 6009100014 | Nokia Networks OY | 09/609,339 | 05-Jul-2000 | | | 010948/0664 | 05-Jul-2000 |
| 6009100015 | Nokia Networks OY | 09/617,661 | 17-Jul-2000 | | | 011336/0720 | 20-Nov-2000 |
| 6009100016 | Nokia Networks OY | 09/638,463 | 14-Aug-2000 | | | 011235/0702 | 02-Nov-2000 |
| 6009100017 | Nokia Networks OY | 09/627,526 | 28-Jul-2000 | | | 011191/0119 | 16-Oct-2000 |
| 6009100018 | Nokia Networks OY | 09/638,458 | 14-Aug-2000 | | | 011303/0145 | 30-Oct-2000 |
| 6009100019 | Nokia Networks OY | 09/654,986 | 05-Sep-2000 | | | 011244/0527 | 03-Nov-2000 |
| 6009100020 | Nokia Networks OY | 10/200,930 | 23-Jul-2002 | | | 011421/0363 | 29-Sep-2000 |
| 6009100021 | Nokia Networks OY | 09/668,315 | 22-Sep-2000 | | | 011110/0275 | 22-Sep-2000 |
| 6009100022 | Nokia Networks OY | 09/669,171 | 25-Sep-2000 | | | 011364/0872 | 04-Dec-2000 |
| 6009100023 | Nokia Networks OY | 09/677,193 | 02-Oct-2000 | | | 011462/0324 | 22-Jan-2001 |
| 6009100024 | Nokia Networks OY | 09/676,729 | 29-Sep-2000 | | | 011168/0362 | 29-Sep-2000 |
| 6009100025 | Nokia Networks OY | 09/697,961 | 27-Oct-2000 | | | 011269/0401 | 27-Oct-2000 |
| 6009100026 | Nokia Networks OY | 09/687,318 | 13-Oct-2000 | | | 011261/0503 | 13-Oct-2000 |
| 6009100027 | Nokia Networks OY | 09/702,587 | 31-Oct-2000 | | | 011270/0101 | 31-Oct-2000 |
| 6009100035 | Nokia Networks OY | 09/355,183 | 26-Aug-1999 | | | 010205/0817 | 30-Aug-1999 |
| 6009100038 | Nokia Networks OY | 09/380,405 | 08-Oct-1999 | | | 011041/0013 | 07-Aug-2000 |
| 6009100040 | Nokia Networks OY | 09/418,166 | 13-Oct-1999 | | | 010534/0730 | 10-Jan-2000 |
| 6009100043 | Nokia Networks OY | 09/420,077 | 18-Oct-1999 | | | 010328/0563 | 18-Oct-1999 |
| 6009100044 | Nokia Networks OY | 09/434,880 | 05-Nov-1999 | 6,490,704 | 03-Dec-2002 | 010376/0360 | 05-Nov-1999 |
| 6009100045 | Nokia Networks OY | 09/419,854 | 19-Oct-1999 | | | 010330/0925 | 19-Oct-1999 |
| 6009100046 | Nokia Networks OY | 09/439,187 | 12-Nov-1999 | | | 010396/0342 | 12-Nov-1999 |
| 6009100047 | Nokia Networks OY | 09/454,119 | 03-Dec-1999 | 6,473,622 | 29-Oct-2002 | 010688/0008 | 13-Mar-2000 |

| | | | | | | | |
|---|---|---|---|---|---|---|---|
| 6009100049 | Nokia Networks OY | 09/490,964 | 24-Jan-2000 | 6,480,715 | 12-Nov-2002 | 010552/0368 | 29-Jan-2000 |
| 6009100050 | Nokia Networks OY | 09/503,016 | 11-Feb-2000 | | | 010611/0678 | 11-Feb-2000 |
| 6009100051 | Nokia Networks OY | 09/501,070 | 09-Feb-2000 | | | 010603/0398 | 09-Feb-2000 |
| 6009100071 | Nokia Networks OY | 09/572,344 | 17-May-2000 | | | 010823/0042 | 17-May-2000 |
| 6009100072 | Nokia Networks OY | 09/572,151 | 17-May-2000 | | | 010821/0064 | 17-May-2000 |
| 6009100073 | Nokia Networks OY | 09/567,186 | 09-May-2000 | | | 010793/0187 | 09-May-2000 |
| 6009100074 | Nokia Networks OY | 09/567,070 | 08-May-2000 | | | 010801/0096 | 08-May-2000 |
| 6009100075 | Nokia Networks OY | 09/559,980 | 27-Apr-2000 | | | 010985/0289 | 24-Jul-2000 |
| 6009100076 | Nokia Networks OY | 09/559,840 | 26-Apr-2000 | | | 011036/0657 | 04-Aug-2000 |
| 6009100077 | Nokia Networks OY | 09/558,995 | 21-Apr-2000 | | | 010971/0586 | 24-Jul-2000 |
| 6009100079 | Nokia Networks OY | 09/539,013 | 30-Mar-2000 | | | 010955/0503 | 28-Jun-2000 |
| 6009100080 | Nokia Networks OY | 09/519,971 | 07-Mar-2000 | | | 010671/0034 | 07-Mar-2000 |
| 6009100081 | Nokia Networks OY | 09/516,966 | 28-Feb-2000 | | | 010933/0050 | 27-Jun-2000 |
| 6009100082 | Nokia Networks OY | 09/808,279 | 14-Mar-2001 | | | 011908/0921 | 19-Jun-2001 |
| 6009100083 | Nokia Networks OY | 09/744,417 | 22-Jan-2001 | | | Unknown | 09-Oct-2002 |
| 6009100084 | Nokia Networks OY | 09/739,094 | 13-Dec-2000 | | | 011669/0122 | 30-Mar-2001 |
| 6009100085 | Nokia Networks OY | 09/733,191 | 08-Dec-2000 | | | 011362/0176 | 08-Dec-2000 |
| 6009100086 | Nokia Networks OY | 09/705,032 | 02-Nov-2000 | | | 011274/0711 | 02-Nov-2000 |
| 6009100087 | Nokia Networks OY | 09/711,217 | 09-Nov-2000 | | | 011775/0212 | 07-May-2001 |
| 6009100088 | Nokia Networks OY | 09/702,922 | 27-Oct-2000 | | | 011272/0084 | 27-Oct-2000 |
| 6009100089 | Nokia Networks OY | 09/821,931 | 30-Mar-2001 | | | 011680/0235 | 30-Mar-2001 |
| 6009100090 | Nokia Networks OY | 09/836,903 | 17-Apr-2001 | | | 012001/0402 | 16-Jul-2001 |
| 6009100092 | Nokia Networks OY | 09/949,588 | 10-Sep-2001 | | | 012157/0974 | 10-Sep-2001 |
| 6009100093 | Nokia Networks OY | 09/913,969 | 20-Aug-2001 | | | 012218/0909 | 20-Aug-2001 |
| 6009100094 | Nokia Networks OY | 09/869,001 | 21-Jun-2001 | | | 012065/0786 | 21-Jun-2001 |
| 6009100095 | Nokia Networks OY | 09/881,335 | 14-Jun-2001 | | | 012173/0490 | 18-Sep-2001 |
| 6009100096 | Nokia Networks OY | 09/827,285 | 05-Apr-2001 | | | 011980/0809 | 13-Jul-2001 |
| 6009100109 | Nokia Networks OY | 09/547,521 | 12-Apr-2000 | | | 011087/0691 | 11-Sep-2000 |
| 6009100116 | Nokia Networks OY | 09/591,595 | 09-Jun-2000 | | | 011803/0320 | 17-May-2001 |
| 6009100117 | Nokia Networks OY | 09/568,927 | 11-May-2000 | | | 010806/0538 | 11-May-2000 |
| 6009100140 | Nokia Networks OY | 09/603,058 | 26-Jun-2000 | 6,366,955 | 02-Apr-2002 | 011131/0640 | 25-Sep-2000 |
| 6009100141 | Nokia Networks OY | 09/603,084 | 26-Jun-2000 | 6,411,809 | 25-Jun-2002 | 011139/0860 | 25-Sep-2000 |
| 6009100145 | Nokia Networks OY | 09/596,450 | 19-Jun-2000 | | | 011192/0032 | 20-Oct-2000 |
| 6009100146 | Nokia Networks OY | 09/603,936 | 27-Jun-2000 | | | 010924/0972 | 27-Jun-2000 |
| 6009100152 | Nokia Networks OY | 09/860,359 | 18-May-2001 | | | 012082/0697 | 13-Aug-2001 |

| 6009100153 | Nokia Networks OY | 09/708,402 | 08-Nov-2000 | | | 011315/0307 | 08-Nov-2000 |
|---|---|---|---|---|---|---|---|
| 6009100154 | Nokia Networks OY | 09/864,534 | 24-May-2001 | | | 012155/0291 | 10-Sep-2001 |
| 6009100155 | Nokia Networks OY | 09/439,536 | 12-Nov-1999 | | | 010394/0102 | 12-Nov-1999 |
| 6009100156 | Nokia Networks OY | 09/703,691 | 01-Nov-2000 | 6,511,234 | 28-Jan-2003 | 011274/0388 | 01-Nov-2000 |
| 6009100157 | Nokia Networks OY | 09/527,979 | 17-Mar-2000 | | | 010955/0487 | 28-Jun-2000 |
| 6009100158 | Nokia Networks OY | 09/436,102 | 08-Nov-1999 | | | 010378/0465 | 08-Nov-1999 |
| 6009100160 | Nokia Networks OY | 09/657,219 | 07-Sep-2000 | 6,438,185 | 20-Aug-2002 | 011090/0888 | 07-Sep-2000 |
| 6027900011 | Nokia Networks OY | 09/540,804 | 31-Mar-2000 | 6,494,252 | 17-Dec-2002 | Unknown | 21-Oct-2002 |
| 6027900012 | Nokia Networks OY | 09/591,907 | 16-May-2000 | | | 010899/0338 | 12-Jun-2000 |
| 6027900016 | Nokia Networks OY | 09/611,406 | 06-Jul-2000 | | | 011189/0274 | 19-Oct-2000 |
| 6028200002 | Nokia Networks OY | 09/912,934 | 25-Jul-2001 | | | 012439/0375 | 09-Jan-2002 |
| 6028200003 | Nokia Networks OY | 09/809,808 | 16-Mar-2001 | | | 011880/0233 | 11-Jun-2001 |
| 6028200005 | Nokia Networks OY | 09/423,373 | 04-Feb-2000 | | | 010600/0598 | 09-Feb-2000 |
| 6028200006 | Nokia Networks OY | 09/753,483 | 03-Jan-2001 | | | 011669/0093 | 30-Mar-2001 |
| 6028200007 | Nokia Networks OY | 09/567,146 | 09-May-2000 | | | 011066/0123 | 28-Aug-2000 |
| 6028200008 | Nokia Networks OY | 09/602,374 | 23-Jun-2000 | | | 011139/0863 | 25-Sep-2000 |
| 6028200009 | Nokia Networks OY | 09/606,481 | 29-Jun-2000 | | | 011244/0702 | 13-Nov-2000 |
| 6028200010 | Nokia Networks OY | 09/607,072 | 29-Jun-2000 | | | 011311/0425 | 16-Nov-2000 |
| 6028200011 | Nokia Networks OY | 09/608,667 | 30-Jun-2000 | | | 011172/0193 | 10-Oct-2000 |
| 6028200012 | Nokia Networks OY | 09/608,945 | 30-Jun-2000 | | | 011315/0068 | 20-Nov-2000 |
| 6028200013 | Nokia Networks OY | 09/627,684 | 28-Jul-2000 | | | 011244/0712 | 13-Nov-2000 |
| 6028200014 | Nokia Networks OY | 09/688,627 | 16-Oct-2000 | | | 011779/0447 | 07-May-2001 |
| 6028200015 | Nokia Networks OY | 09/699,064 | 27-Oct-2000 | | | 011504/0930 | 06-Feb-2001 |
| 6028200016 | Nokia Networks OY | 09/741,135 | 18-Dec-2000 | | | 011746/0058 | 26-Apr-2001 |
| 6028200017 | Nokia Networks OY | 09/716,711 | 20-Nov-2000 | | | 011690/0418 | 06-Apr-2001 |
| 6028200018 | Nokia Networks OY | 09/717,535 | 21-Nov-2000 | | | 011727/0337 | 16-Apr-2001 |
| 6028200019 | Nokia Networks OY | 09/734,070 | 11-Dec-2000 | | | 011651/0746 | 22-Mar-2001 |
| 6028200020 | Nokia Networks OY | 09/748,505 | 26-Dec-2000 | | | 011690/0190 | 04-Apr-2001 |
| 6028200021 | Nokia Networks OY | 09/751,036 | 28-Dec-2000 | | | 011690/0200 | 06-Apr-2001 |
| 6028200022 | Nokia Networks OY | 09/792,499 | 23-Feb-2001 | | | 011818/0100 | 15-May-2001 |
| 6028200023 | Nokia Networks OY | 09/792,611 | 23-Feb-2001 | | | 011818/0003 | 15-May-2001 |
| 6028200024 | Nokia Networks OY | 09/824,938 | 03-Apr-2001 | | | 011940/0900 | 02-Jul-2001 |
| 6028200025 | Nokia Networks OY | 09/824,939 | 03-Apr-2001 | | | 011933/0169 | 29-Jun-2001 |
| 6028200026 | Nokia Networks OY | 09/825,898 | 04-Apr-2001 | | | 011980/0472 | 13-Jul-2001 |
| 6028200027 | Nokia Networks OY | 09/840,410 | 23-Apr-2001 | | | 012013/0448 | 27-Jul-2001 |

10370597 .022403

| | | | | | | | |
|---|---|---|---|---|---|---|---|
| 6028200028 | Nokia Networks OY | 09/843,193 | 26-Apr-2001 | | | 012029/0419 | 30-Jul-2001 |
| 6028200029 | Nokia Networks OY | 09/844,879 | 27-Apr-2001 | | | 012109/0258 | 24-Aug-2001 |
| 6028200030 | Nokia Networks OY | 09/846,987 | 01-May-2001 | | | 012063/0779 | 09-Aug-2001 |
| 6028200031 | Nokia Networks OY | 09/848,751 | 01-May-2001 | | | 012115/0141 | 27-Aug-2001 |
| 6028200032 | Nokia Networks OY | 09/860,190 | 17-May-2001 | | | 012139/0896 | 07-Sep-2001 |
| 6028200033 | Nokia Networks OY | 09/862,127 | 21-May-2001 | | | 012126/0362 | 31-Aug-2001 |
| 6028200034 | Nokia Networks OY | 09/862,715 | 22-May-2001 | | | 012118/0619 | 30-Aug-2001 |
| 6028200036 | Nokia Networks OY | 09/876,462 | 07-Jun-2001 | 6,493,564 | 10-Dec-2002 | 012267/0795 | 15-Oct-2001 |
| 6028200037 | Nokia Networks OY | 09/876,562 | 07-Jun-2001 | | | 012392/0045 | 26-Dec-2001 |
| 6028200038 | Nokia Networks OY | 09/888,660 | 25-Jun-2001 | | | 012799/0463 | 02-Apr-2002 |
| 6028200039 | Nokia Networks OY | 09/893,028 | 27-Jun-2001 | | | 012389/0384 | 26-Dec-2001 |
| 6028200040 | Nokia Networks OY | 09/901,814 | 10-Jul-2001 | | | 012523/0281 | 18-Oct-2001 |
| 6028200041 | Nokia Networks OY | 09/902,027 | 10-Jul-2001 | | | 013005/0284 | 18-Jun-2002 |
| 6028200042 | Nokia Networks OY | 09/903,901 | 12-Jul-2001 | | | 012398/0975 | 27-Dec-2001 |
| 6028200044 | Nokia Networks OY | 09/906,372 | 16-Jul-2001 | | | 012274/0073 | 15-Oct-2001 |
| 6028200045 | Nokia Networks OY | 09/906,377 | 16-Jul-2001 | | | 012920/0755 | 24-Jul-2002 |
| 6028200046 | Nokia Networks OY | 09/911,219 | 23-Jul-2001 | | | 012408/0257 | 31-Dec-2001 |
| 6028200047 | Nokia Networks OY | 09/920,362 | 01-Aug-2001 | | | 012455/0219 | 08-Jan-2002 |
| 6028200048 | Nokia Networks OY | 09/934,034 | 21-Aug-2001 | | | 012927/0111 | 28-May-2002 |
| 6028200049 | Nokia Networks OY | 09/947,677 | 06-Sep-2001 | | | 012489/0657 | 14-Jan-2002 |
| 6028200050 | Nokia Networks OY | 09/947,842 | 06-Sep-2001 | | | 012432/0828 | 04-Jan-2002 |
| 6028200051 | Nokia Networks OY | 09/949,949 | 10-Sep-2001 | | | 012457/0738 | 09-Jan-2002 |
| 6028200052 | Nokia Networks OY | 09/952,370 | 11-Sep-2001 | | | 012442/0651 | 07-Jan-2002 |
| 6028200053 | Nokia Networks OY | 09/954,363 | 17-Sep-2001 | | | 012457/0680 | 06-Nov-2001 |
| 6028200054 | Nokia Networks OY | 09/970,754 | 03-Oct-2001 | | | 012534/0187 | 28-Jan-2002 |
| 6028200055 | Nokia Networks OY | 09/970,757 | 03-Oct-2001 | | | 012675/0714 | 06-Mar-2002 |
| 6028200056 | Nokia Networks OY | 09/971,909 | 05-Oct-2001 | | | 012416/0761 | 03-Jan-2002 |
| 6028200057 | Nokia Networks OY | 09/977,899 | 09-Oct-2001 | | | 012480/0343 | 11-Jan-2002 |
| 6028200058 | Nokia Networks OY | 09/978,431 | 15-Oct-2001 | | | 012456/0473 | 09-Jan-2002 |
| 6028200059 | Nokia Networks OY | 09/999,569 | 01-Nov-2001 | | | 012558/0521 | 30-Jan-2002 |
| 6028200060 | Nokia Networks OY | 10/000,242 | 18-Oct-2001 | | | 012561/0125 | 28-Jan-2002 |
| 6028200062 | Nokia Networks OY | 10/002,242 | 23-Oct-2001 | | | 012566/0175 | 28-Jan-2002 |
| 6028200063 | Nokia Networks OY | 10/008,783 | 13-Nov-2001 | | | 012602/0196 | 11-Feb-2002 |
| 6028200064 | Nokia Networks OY | 10/013,098 | 06-Nov-2001 | | | 012624/0434 | 19-Feb-2002 |
| 6028200070 | Nokia Networks OY | 09/549,102 | 12-Apr-2000 | | | 011053/0893 | 22-Aug-2000 |

10370597.022403

| | | | | | | | |
|---|---|---|---|---|---|---|---|
| 6028200071 | Nokia Networks OY | 09/607,065 | 29-Jun-2000 | | | 011139/0865 | 25-Sep-2000 |
| 6028200072 | Nokia Networks OY | 09/954,370 | 17-Sep-2001 | 6,501,957 | 31-Dec-2002 | 012427/0958 | 03-Jan-2002 |
| 6028200073 | Nokia Networks OY | 09/982,589 | 17-Oct-2001 | | | 012481/0584 | 10-Jan-2002 |
| 6028200075 | Nokia Networks OY | 09/638,677 | 15-Aug-2000 | | | 011317/0515 | 20-Nov-2000 |
| 6028200076 | Nokia Networks OY | 09/765,492 | 18-Jan-2001 | | | 011669/0081 | 30-Mar-2001 |
| 6028200077 | Nokia Networks OY | 09/757,873 | 19-Jan-2001 | | | 011609/0804 | 09-Mar-2001 |

What is claimed is:

1. An access control system for controlling access by wireless terminals to a wireless telecommunications network, the access control system comprising:

a database storing the identities of a set of wireless terminals belonging to the telecommunications network;

a configurable store configurable in two ways by use of a supplementary access value, the value being capable of being set in one way to indicate that terminals that do not belong to the telecommunications network may access the network and the value being capable of being set in another way to indicate that terminals that do not belong to the telecommunications network may not access the network; and an access control unit for receiving an access request message indicating the identity of a wireless terminal and in response to that message accessing the database and/or the store to permit access by the wireless terminal to the wireless telecommunications network if:

a. the identity of the wireless terminal is present in the database; or b. the value is set to indicate that terminals that do not belong to the telecommunications network may access the network.

2. An access control system as claimed in claim 1, wherein the access control unit is configured to, in order to permit access to the said network, send a reply to the access request message indicating that access to the said network is permitted.

3. An access control system as claimed in claim 2, wherein the access control unit is configured to, if:

a. the identity of the wireless terminal is not present in the database; and b. the supplementary access value indicates that terminals that do not belong to the telecommunications network may not access the said network;

send a reply to the access request message indicating that access to the said network is not permitted.

4. An access control system as claimed in claim 1, wherein the said network is operable according to the GSM standard or a derivative thereof.

5. An access control system as claimed in claim 1, wherein the other wireless telecommunications network is operable according to the GSM standard or a derivative thereof.

6. An access control system according to claim 4, wherein the said message to the other wireless telecommunications network indicating that access to the said network is not permitted is a location update reject message with location access not allowed.

7. An access control system as claimed in claim 1, wherein the said access is a location update access.

8. An access control system as claimed in claim 1, wherein the said identities of wireless terminals are IMSIs.

9. An access control system as claimed in claim 1, wherein the said telecommunications network is a cellular telephone system.

10. A method for controlling access by wireless terminals to a wireless telecommunications network having a database storing the identities of a set of wireless terminals belonging to the telecommunications network and a configurable store configurable in two ways by use of a supplementary access value, the value being capable of being set in one way to indicate that terminals that do not belong to the telecommunications network may access the network and the value being capable of being set in another way to indicate that terminals that do not belong to the telecommunications network may not access the network; the method comprising:

receiving an access request message indicating the identity of a wireless terminal;

accessing the database to determine whether the identity of the wireless terminal is present in the database and/or accessing the supplementary access value to determine whether it indicates that terminals that do not belong to the telecommunications network may access the network; and if the identity of the wireless terminal is present in the database, or the value is set to indicate that terminals that do not belong to the telecommunications network may access the network, transmitting a message to permit the wireless terminal access to the wireless telecommunications network.

* * * * *